US009085858B2

(12) United States Patent
Muse et al.

(10) Patent No.: US 9,085,858 B2
(45) Date of Patent: Jul. 21, 2015

(54) ROAD DRYING APPARATUS AND METHOD (75) Inventors: Kevin S. Muse, Greenville, SC (US); Brian M. O'Connor, Palm City, FL (US)

(73) Assignee: ROAD DRYER LLC, Greenville, SC (US)

( * ) Notice: Subject to any disclaimer, the term of this patent is extended or adjusted under 35 U.S.C. 154(b) by 958 days.

(21) Appl. No.: 13/211,368

(22) Filed: Aug. 17, 2011

(65) Prior Publication Data

US 2013/0042498 A1 Feb. 21, 2013

(51) Int. Cl.
*F26B 21/00* (2006.01)
*F26B 23/02* (2006.01)
*E01C 23/14* (2006.01)
*F26B 19/00* (2006.01)

(52) U.S. Cl.
CPC .............. *E01C 23/14* (2013.01); *F26B 19/005* (2013.01); *F26B 21/004* (2013.01); *F26B 23/02* (2013.01)

(58) Field of Classification Search
CPC ...... E01C 23/14; F26B 19/005; F26B 21/004; F26B 23/02

USPC .............. 34/406, 418, 423, 426, 92, 69; 126/271.1, 276, 268
See application file for complete search history.

(56) References Cited

U.S. PATENT DOCUMENTS

| | | | | |
|---|---|---|---|---|
| 4,559,720 A | * | 12/1985 | Marquardt | 34/137 |
| 6,367,469 B1 | * | 4/2002 | Zacho | 126/271.2 R |
| 2010/0024242 A1 | * | 2/2010 | Friesen et al. | 34/406 |

* cited by examiner

*Primary Examiner* — Jiping Lu
(74) *Attorney, Agent, or Firm* — Hodgson Russ LLP (57) ABSTRACT A road dryer delivers heated air to a surface through an adjustable-width nozzle assembly having nozzle boxes designed to provide turbulent flow of drying air. The road dryer includes a combustion system having a high-pressure atomized fuel burner supplied with diesel fuel by a variable frequency drive fuel pump and a closed-loop air temperature control to limit the temperature of the drying air. The combustion system includes a combustion chamber having a cylindrical inner shell housing the burner and a cylindrical outer shell defining an annular space around the inner shell for the flow of process air. The inner shell has an axially elongated exhaust port aligned with an axially elongated outlet opening of the outer shell to achieve mixing of high temperature exhaust gas with process air. The nozzle assembly is vertically adjustable relative to a chassis of the road dryer between a stowed position and an operating position.

14 Claims, 11 Drawing Sheets

ROAD DRYING APPARATUS AND METHOD

FIELD OF THE INVENTION

This invention is directed to the field of road maintenance, repair and paving. In particular, this invention has utility for the rapid drying of road surfaces to expedite paving.

BACKGROUND OF THE INVENTION

During road paving, the surface to be paved must be dry to in accordance with Department of Transportation (DOT) requirements before paving can commence. A machine that will allow expedited drying saves road paving crews significant time and money. As an example, roads crews arriving early morning before sunrise often encounter high levels of dew on the surface to be paved. Typically they would be on hold until the sun had risen and provided sufficient heat for drying. This type of delay is very problematic because many road projects are on a very short time schedule in order to keep traffic moving. In addition, it is very costly to the paving companies to have entire crews standing around waiting for the sunrise to achieve required DOT levels of dryness.

Another challenge road paving and maintenance crews face is short rain showers. A quick five-minute rain shower can stop a road paving crew for over an entire day or longer. Also, trucks are continuously bringing asphalt and materials to the job site; if the project is delayed due to rain these materials are no longer usable and must be disposed.

Road drying machines of the prior art, sometimes referred to as "jet dryers," use a turbine engine exhaust which exhibits several problems. The shortcomings faced include: 1) inability to remove moisture from the air used for drying; 2) inability to reduce or minimize the addition of spent hydrocarbons into the drying air stream; 3) tendency to exceeding the DOT maximum allowable temperature for the road surface; 4) noise levels are too high to operate close to personnel or nearby road traffic; 5) the air stream cannot be directed to the road surface whereby it prevents using the machine in conjested traffic areas where most paving is done; 6) the jet engine is susceptible to failure due to the intake of foreign particles, and the process by nature is typically operated in a very dust filled environment due to the close proximity of mechanical brooms; 7) jet engines require frequent maintenance and construction personnel are not able to maintain or repair jet engines without outside help; and 8) jet dryers are prohibitively expensive to operate for a road drying application. Drying or conditioning the air prior to release onto the surface is important to increase the water-holding capacity of the air and thus make the drying machine faster and more efficient. Reducing the hydrocarbons resulting from combustion is important because hydrocarbons contain, and rapidly collect, moisture which reduces drying capability and adds a residual film on the road surface that is not desirable. Air delivery temperatures should not exceed 300 degrees Fahrenheit for extended periods of time, as this is a temperature acceptable in DOT paving operations.

Finally, road drying machines of the prior art may be incapable of nozzle adjustment to fit road surfaces having different widths, or to accommodate various curb and median arrangements.

SUMMARY OF THE INVENTION

The present invention is embodied by an apparatus for drying a surface in the form of a trailer, but could be embodied in a stand alone vehicle. The apparatus comprises a chassis including at least one transversely extending axle having a leftmost wheel and a rightmost wheel, a combustion system carried by the chassis and operable to generate heated air, at least one duct in flow communication with the combustion system, and a nozzle assembly mounted on the chassis and arranged in flow communication with the combustion system via the at least one duct for directing the heated process air onto the surface to be dried.

In an embodiment of the invention, the combustion system comprises a process air intake for providing a flow of process air, a combustion chamber, a diesel oil burner for the combustion chamber, a fuel supply system for delivering fuel oil to the burner, and a mixing manifold arranged to receive hot combustion exhaust gas and process air from the combustion chamber. The combustion chamber includes a generally cylindrical outer shell having an axially elongated outlet opening, and a generally cylindrical inner shell arranged within the outer shell to define an annular space between the inner and outer shells and having an axially elongated exhaust port facing the outlet opening of the outer shell. The process air intake directs a flow of process air into the annular space between the inner and outer shells, and the flow of process air around the inner shell pulls hot exhaust gases from the inner shell as the flow enters the mixing manifold. A plurality flexible ducts convey heated airflow from the mixing manifold to the nozzle assembly.

The nozzle assembly may be mounted for vertical movement relative to the chassis between an upward stowed position and a downward operating position. In one arrangement, a cable hoist provides lifting power, and a spring-loaded lock bar is provided to maintain the nozzle assembly in its upward stowed position. The nozzle assembly may comprise a plurality of nozzle boxes, and multiple flexible ducts communicate heated air to respective nozzle boxes. Leftmost and rightmost nozzle boxes may be mounted by hinges to independently adjust between a refracted (folded) configuration and an extended configuration to adjust the overall width of the nozzle assembly.

The burner of the combustion system may be a high-pressure atomized fuel burner supplied with fuel by a variable frequency drive, and the temperature of the heated air delivered through the nozzle assembly may be monitored to enable closed-loop temperature control to prevent overheated air.

In a further embodiment, the invention provides a method of drying a surface comprising the steps of: (A) providing a vehicle comprising a combustion system operable to generate heated air and a nozzle assembly in flow communication with the combustion system for directing the heated air onto the surface to be dried, wherein the nozzle assembly is adjustable to different transverse widths, wherein the nozzle assembly is mounted on the vehicle for vertical movement relative between an upward stowed position and a downward operating position; (B) driving the vehicle to a job site while the nozzle assembly is in its upward stowed position; (C) lowering the nozzle assembly to its downward operating position; (D) adjusting the transverse width of the nozzle assembly; (E) operating the combustion system to generate heated air; and (F) driving the vehicle while the nozzle assembly is in its operating position and the combusting system is generating heated air, whereby the heated air is directed onto the surface by the nozzle assembly.

BRIEF DESCRIPTION OF THE DRAWING VIEWS

Features and advantages of embodiment(s) of the present disclosure will become apparent by reference to the following detailed description and drawings, in which like reference numerals correspond to similar, though perhaps not identical components. Reference numerals having a previously described function may or may not be described in connection with other drawings in which they appear.

DETAILED DESCRIPTION OF THE INVENTION

Figure 1:
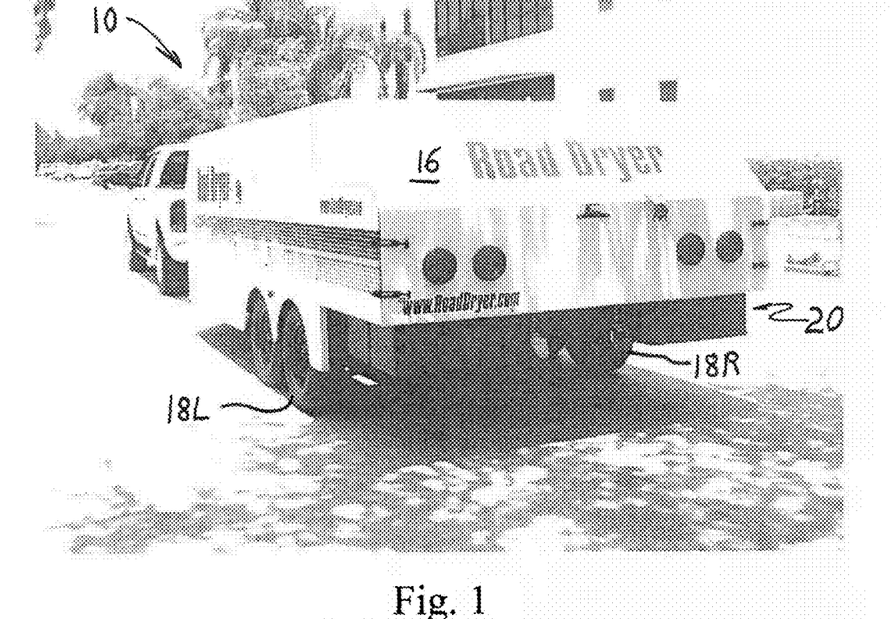
FIG. 1 is a perspective view showing a road dryer formed in accordance with an embodiment of the present invention, wherein the road dryer is shown hitched to a pickup truck.
Figure 2:
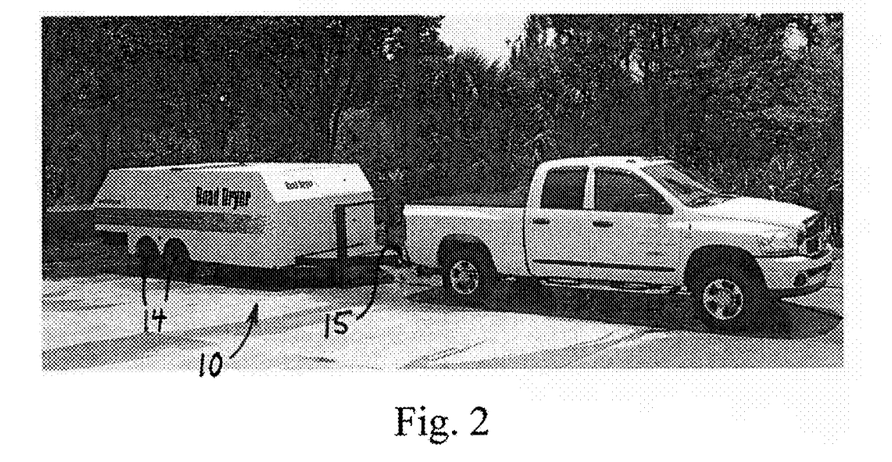
FIG. 2 is another perspective view of road dryer shown in FIG. 1.
Figure 14:
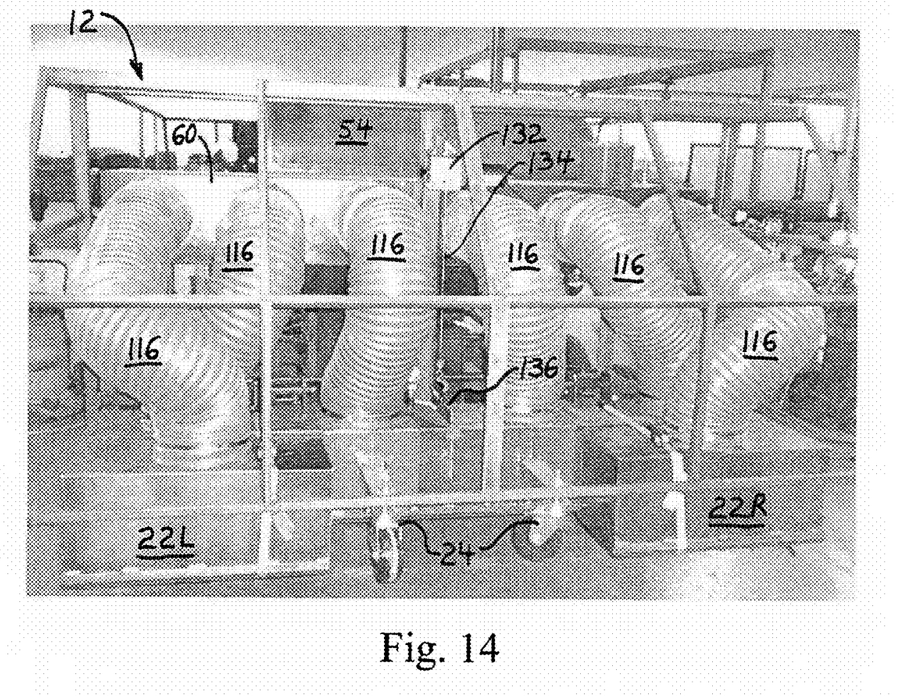
FIG. 14 is a rear perspective view of the road dryer with an outer body of the road dryer removed to show the chassis and internal structure.
Figure 15:
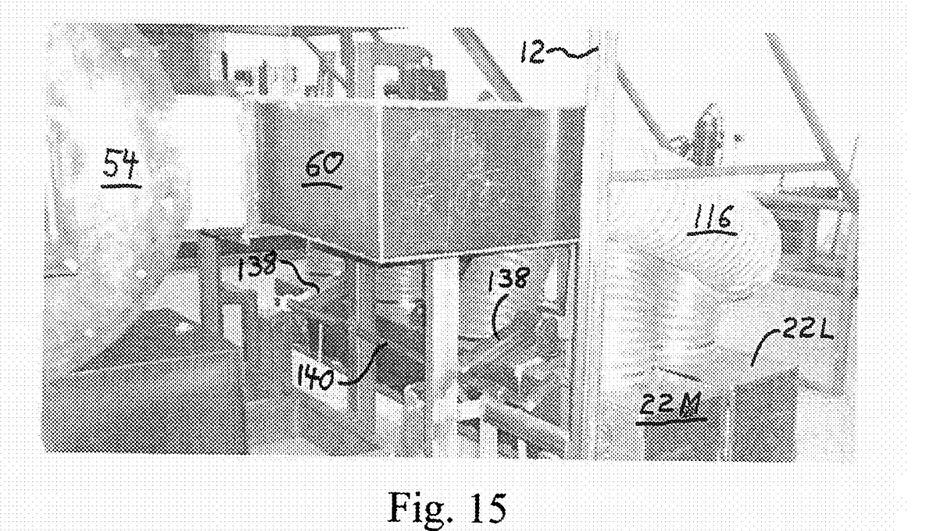
FIG. 15 is a side perspective view of the road dryer with body removed.
Figure 16:
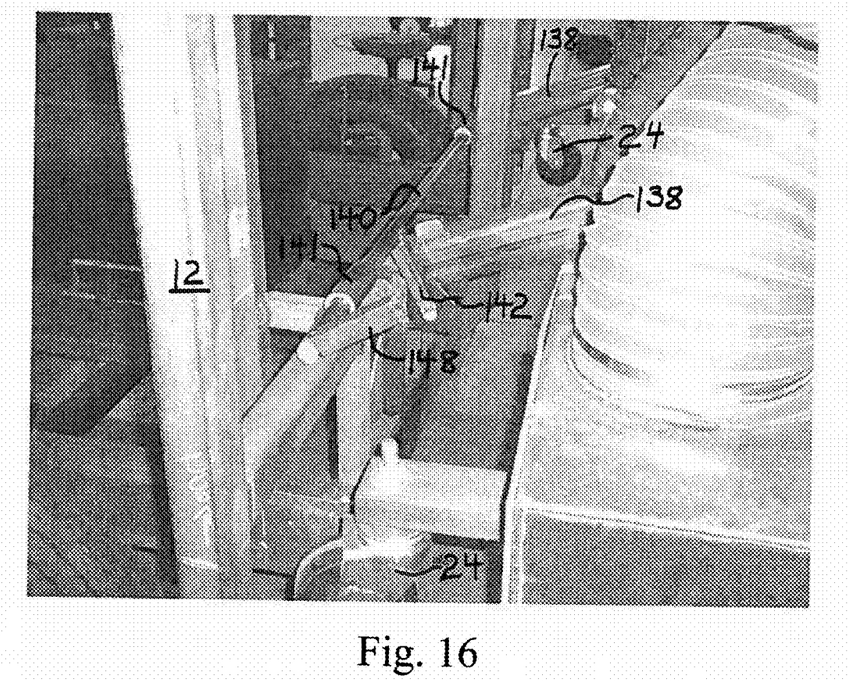
FIG. 16 is a close-up view showing hinge arms and a lock bar of the nozzle assembly.

Reference is initially made to FIGS. 1 and 2 of the drawings. In FIG. 1, a road drying machine 10 formed in accordance with an embodiment of the present invention is shown hitched to a towing vehicle in the form of a pickup truck. It will be understood that the truck and road drying machine 10 removably coupled thereto collectively form a road drying vehicle. The present specification describes road drying machine 10 as being embodied in a removably attached trailer, however those skilled in the art will readily understand that road drying machine 10 could also be embodied as permanent part of a stand alone vehicle. Road dryer 10 is operable to direct airflow onto a road surface to dry the road surface, for example to prepare the road surface for paving. In the embodiment shown, road dryer 10 generally comprises a chassis 12 (not visible in FIGS. 1-2; see FIG. 14) supported near its rear end by wheeled axles 14 and having a trailer hitch 15 at its front end for coupling to a towing vehicle. Road dryer 10 includes an outer body 16, a leftmost wheel 18L, and a rightmost wheel 18R.

Figure 3:
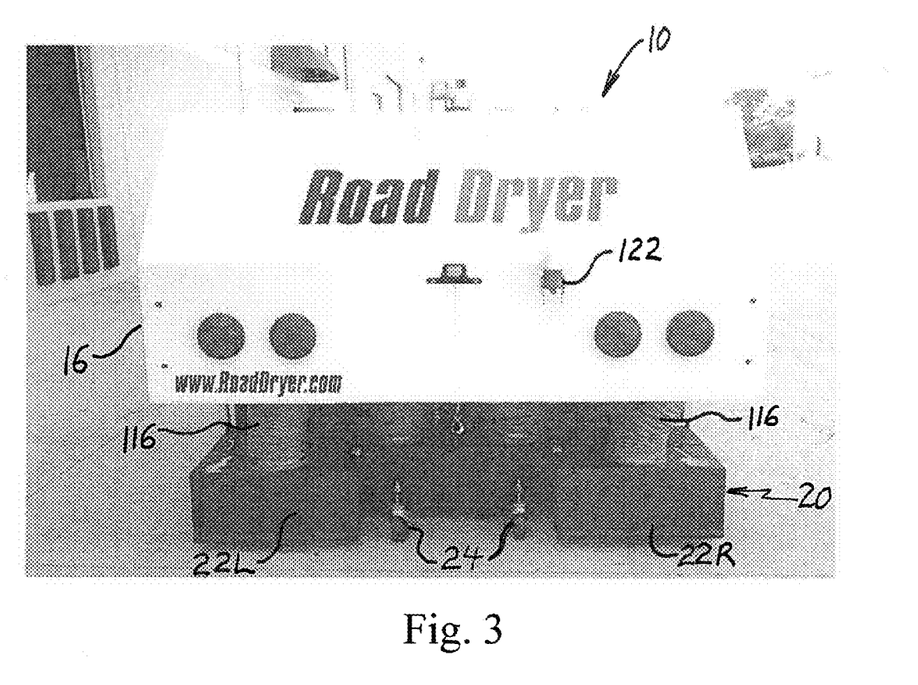
FIG. 3 is a rear view of the road dryer showing a nozzle assembly of the road dryer in a lowered position for road drying operation, wherein the nozzle assembly is adjusted to an eight-foot wide configuration.
Figure 4:
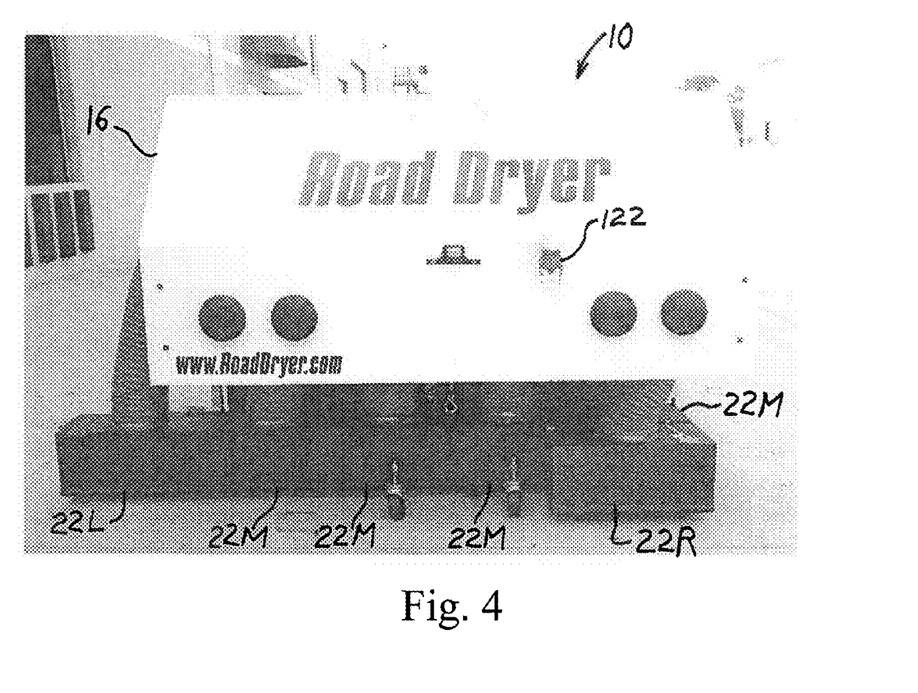
FIG. 4 is a view similar to that of FIG. 3, wherein the nozzle assembly is adjusted to a ten-foot wide configuration.
Figure 5:
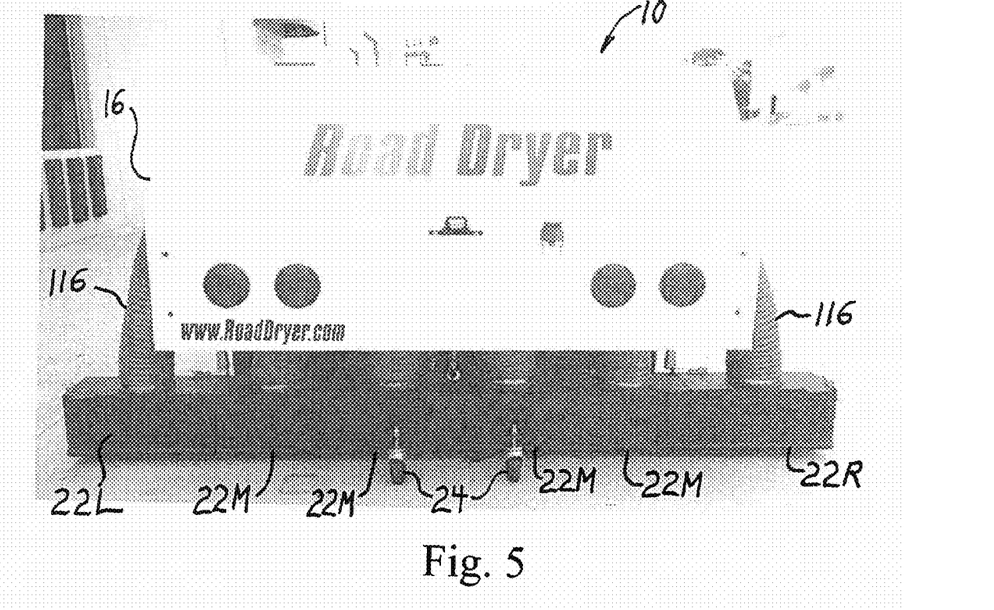
FIG. 5 is a view similar to that of FIG. 3, wherein the nozzle assembly is adjusted to a twelve-foot wide configuration.

Additional reference is now made to FIGS. 3-5. Road dryer 10 further comprises a nozzle assembly 20 mounted at the rear end of chassis 12 for directing airflow onto a road surface to be dried. Nozzle assembly 20 is mounted on chassis 12 by a vertical lift mechanism, described in detail below, that is operable to raise nozzle assembly 20 relative to the chassis to a stowed position away from the road surface as shown in FIG. 1 so that road dryer 10 may be towed to and from a jobsite, and to lower nozzle assembly 20 relative to the chassis to an operating position closely adjacent to the road surface as shown in FIGS. 3-5.

Nozzle assembly 20 is readily adjustable to different width configurations depending upon the road surface and surrounding obstacles (e.g., curbs, medians, etc.). FIG. 3 shows nozzle assembly in a relatively narrow width configuration wherein the entire nozzle assembly is within the transverse extent of leftmost wheel 18L and rightmost wheel 18R, and also within the transverse extent of outer body 16. FIG. 4 illustrates nozzle assembly 20 adjusted to a wider configuration wherein the nozzle assembly extends in a transverse (lateral) direction beyond leftmost wheel 18L and the left side of outer body 16. This configuration is particularly useful when it is desirable to reach road surface areas just beyond the left side of leftmost wheel 18L, for example areas adjacent to a curb or raised median on the left side of road dryer 10. A configuration similar to that shown in FIG. 4 is possible on the right side and is particularly useful when it is desirable to reach road surface areas beyond the right side of rightmost wheel 18R, for example areas adjacent to a curb or raised median on the right side of road dryer 10. FIG. 5 shows another configuration of nozzle assembly 20 that is wider than the configurations shown in FIGS. 3 and 4. In the configuration of FIG. 5, nozzle assembly 20 extends transversely beyond leftmost wheel 18L and the left side of outer body 16 on one side, and beyond rightmost wheel 18R and the right side of outer body 16 on the other side.

Figure 6:
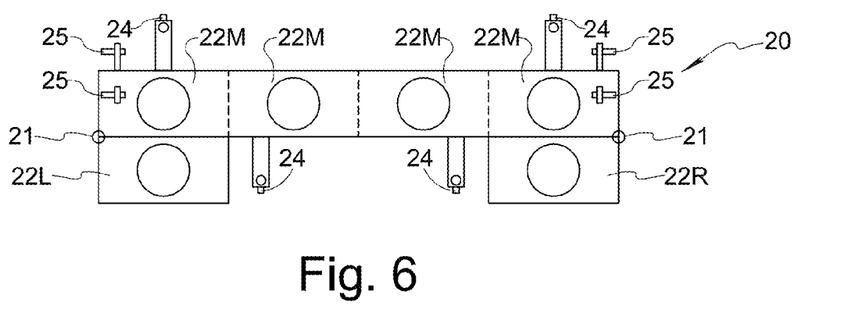
FIG. 6 is a top plan view of the nozzle assembly wherein the nozzle assembly is adjusted to an eight-foot wide configuration.
Figure 7:
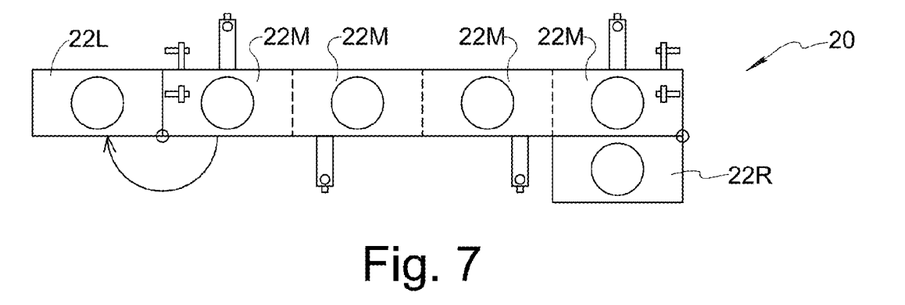
FIG. 7 is a view similar to that of FIG. 6, wherein the nozzle assembly is adjusted to a first ten-foot wide configuration.
Figure 8:
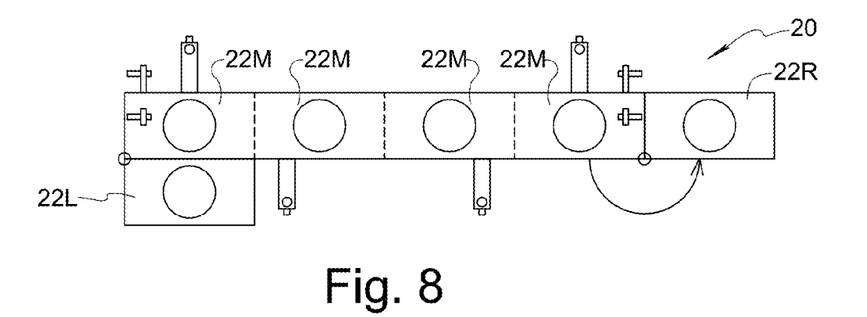
FIG. 8 is a view similar to that of FIG. 6, wherein the nozzle assembly is adjusted to a second ten-foot wide configuration.
Figure 9:
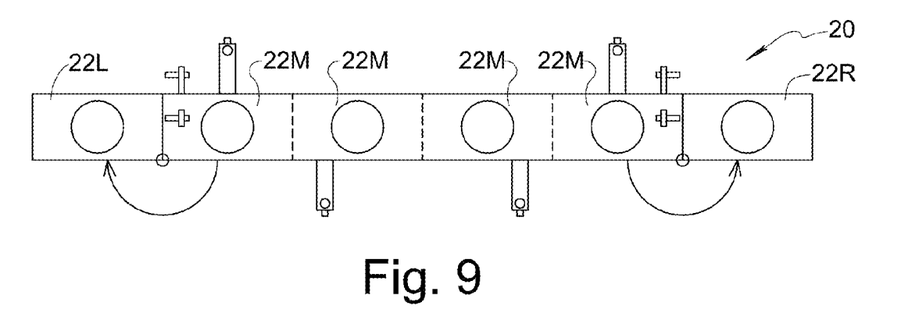
FIG. 9 is a view similar to that of FIG. 6, wherein the nozzle assembly is adjusted to a twelve-foot wide configuration.

Adjustability of nozzle assembly 20 to different width configurations will now be described with reference to FIGS. 6-9, which show the nozzle assembly in top plan view. Nozzle assembly 16 may include a plurality of discrete nozzle boxes 22 that includes a leftmost nozzle box 22L, a rightmost nozzle box 22R, and at least one middle nozzle box 22M between the leftmost and rightmost nozzle boxes. In the present embodiment, there are four middle nozzle boxes 22M. Leftmost nozzle box 22L is hingedly attached to its adjacent middle nozzle box 22M by a first hinge 21. Similarly, rightmost nozzle box 22R is hingedly attached to its adjacent middle nozzle box 22M by a second hinge 21. As will be understood, leftmost nozzle box 22L is pivotable relative to its adjacent middle nozzle box 22M between an extended configuration wherein leftmost nozzle box 22L is transversely aligned with middle nozzle boxes 22M as shown in FIGS. 7 and 9 such that leftmost nozzle box 22L extends in a transverse direction beyond leftmost wheel 18L, and a retracted configuration wherein leftmost nozzle box 22L is transversely overlapped with its adjacent middle nozzle box 22M as shown in FIGS. 6 and 8 such that leftmost nozzle box 22L does not extend in a transverse direction beyond leftmost wheel 18L. In symmetrical fashion, rightmost nozzle box 22R is pivotable relative to its adjacent middle nozzle box 22M between an extended configuration wherein rightmost nozzle box 22R is transversely aligned with middle nozzle boxes 22M as shown in FIGS. 8 and 9 such that rightmost nozzle box 22R extends in a transverse direction beyond rightmost wheel 18R, and a retracted configuration wherein rightmost nozzle box 22R is transversely overlapped with its adjacent middle nozzle box 22M as shown in FIGS. 6 and 7 such that rightmost nozzle box 22R does not extend in a transverse direction beyond rightmost wheel 18R. Hinges 21 may be locking hinges operable to lock the associated nozzle box 22L or 22R in its extended and retracted configurations. Alternatively, respective locking mechanisms (not shown) may be mounted on adjacent nozzle boxes 22L, 22M and on adjacent nozzle boxes 22R, 22M to secure the nozzle boxes in the extended and retracted configurations. Where more than one middle nozzle box 22M is provided, the middle nozzle boxes 22M may be fixed to one another, such as by fasteners or welding. Alternatively, middle nozzle boxes may be formed by providing an elongated nozzle box with partitioning walls to define the individual shorter nozzle boxes, whereby adjacent middle nozzle boxes would share a common partition wall. Nozzle boxes 22 may be dimensioned such that the configuration shown in FIG. 6 is approximately eight feet wide, the configurations shown in FIGS. 7 and 8 are approximately ten feet wide, and the configuration shown in FIG. 9 is approximately twelve feet wide. In a currently preferred embodiment, nozzle boxes are approximately one-foot long from front-to-rear and approximately two feet wide.

As may be seen in FIGS. 6-9, nozzle assembly 20 is provided with a pair of wheel attachments 24 fixed to extend rearwardly from respective middle nozzle boxes 22M that are centrally located and not overlapped when leftmost nozzle box 22L and rightmost nozzle box 22R are adjusted to their retracted configurations. Nozzle assembly 20 is provided with another pair of wheel attachments 24 fixed to extend forwardly from respective middle nozzle boxes 22M that are adjacent to leftmost nozzle box 22L and rightmost nozzle box 22R. Wheel attachments 24 engage the surface being dried when nozzle assembly 20 is lowered to its operating position to maintain the bottom edges of the nozzle boxes at a suitable proximate distance from the surface to be dried, for example approximately two inches. Wheel attachments 24 also provide additional support for nozzle assembly 20 in the operating position. Wheel attachments 24 may have swivel-mounted wheels to accommodate turning in different directions. Hinge pin assemblies 25 may be mounted on middle nozzle boxes 22M for pivotally coupling hinge arms 138 (see FIGS. 15-18) to nozzle assembly 20.

Figure 19:
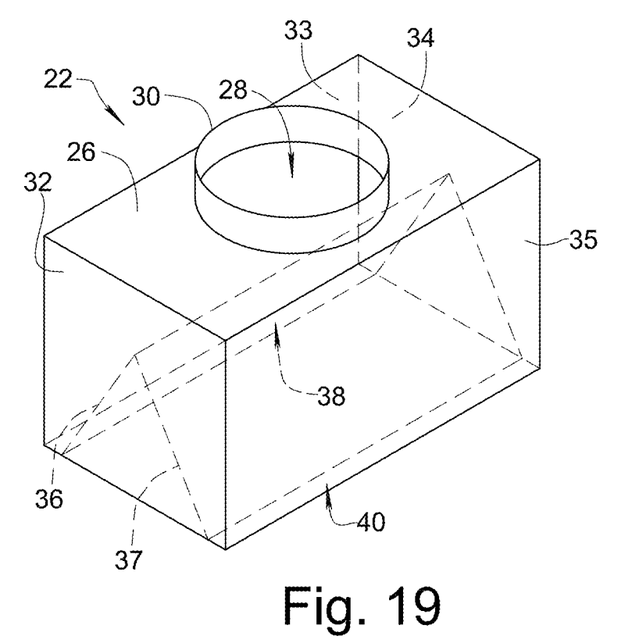
FIG. 19 is an orthogonal view illustrating a nozzle box of the nozzle assembly.
Figure 20:
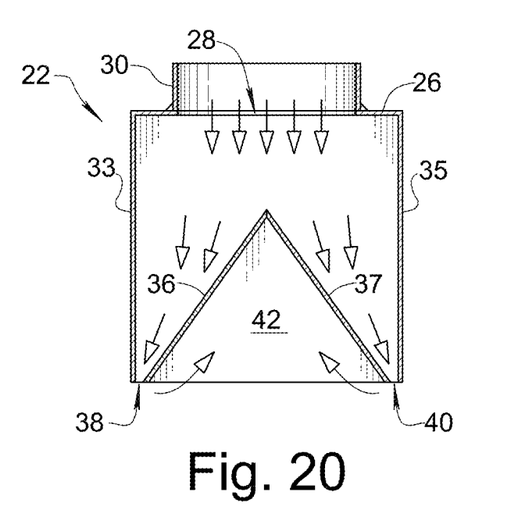
FIG. 20 is a cross-sectional view of the nozzle box shown in FIG. 19.

FIGS. 19 and 20 show a single nozzle box 22 in greater detail. Nozzle box 22 includes a top wall 26 having an inlet opening 28 through which a flexible duct (described later in this specification) communicates a flow of heated air to the nozzle box. Inlet opening 28 may be surrounded by neck 30 for facilitating attachment of an end of the duct. Nozzle box 22 further includes a left side wall 32, a right side wall 34, a front side wall 33, and a rear side wall 35 each depending downwardly from top wall 26 to define an internal space. Within the internal space defined by the side walls is a pair of inclined walls 36 and 37 extending between left side wall 32 and right side wall 34. The internal inclined walls 36 and 37 form an inverted V-shaped profile, wherein a front discharge slot 38, a rear discharge slot 40, and a substantially enclosed space 42 between the front and rear discharge slots are defined. Leftmost nozzle box 22L may further include a side discharge slot (not shown) through its left side wall 32, and rightmost nozzle box 22R may further include a side discharge slot (not shown) through its right side wall 34, for better directing drying air to the junction of the road surface with a vertical curb, which is an area that is difficult to reach solely with air flow from downwardly directed discharge slots 38, 40. Nozzle boxes 22 may be manufactured from steel or suitable alloys.

Nozzle boxes 22 incorporate features to promote faster drying. Internal inclined walls 36, 37 create dual reducers to increase airflow velocity out of discharge slots 38, 40, thereby increasing drying efficiency. The separation of discharge slots 38, 40 from one another, slight elevation of discharge slots 38, 40 from the surface being dried, and provision of enclosed space 42 between the discharge slots creates turbulence and interaction between the flow of heated air and the liquid water beneath the nozzle box, suspending water droplets and promoting evaporation rather than just pushing the water around. The configuration of nozzle boxes 22 creates a flow that travels front to rear as the air exits the nozzles and air dryer 10 moves forward, which promotes longer exposure of the air to the surface of the pavement. If nozzle boxes 22 are made significantly wider, this beneficial effect is reduced.

Reference is now made to FIGS. 14-15 and 21-24. Nozzle assembly 20 receives a flow of heated air supplied by a combustion system 50 carried by chassis 12. Combustion system 50 is operable to generate heated air, and generally comprises a process air intake 52, a combustion chamber 54 in flow communication with air intake 52, a burner 56 associated with the combustion chamber, a fuel supply system 58 connected to the burner, and a mixing manifold 60 in flow communication with combustion chamber 54.

Figure 21:
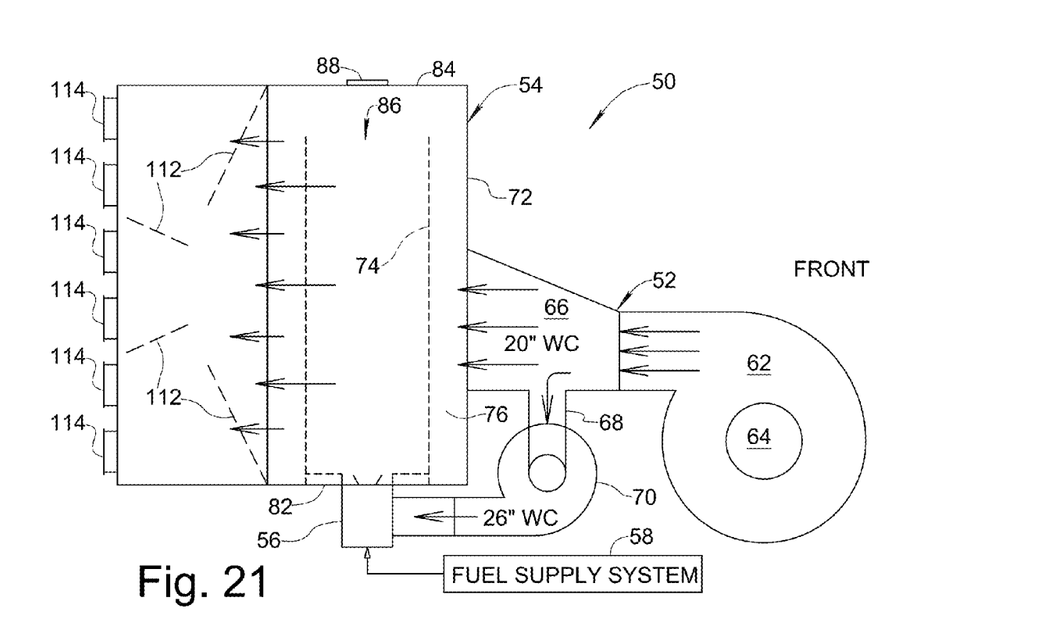
FIG. 21 is a schematic top plan view of a combustion system of the road dryer.

In the present embodiment, process air intake 52 includes a process fan 62 powered by a diesel engine 64 and an intake duct 66 arranged to receive airflow generated by process fan 62. By way of non-limiting example, process fan 62 may have a capacity of ±10,000 SCFM (standard cubic feet per minute) and air intake duct 66 may be configured to have a static pressure of approximately twenty inches WC (water column). Process air intake 52 may further include a combustion air conduit 68 branching from intake duct 66 and a combustion blower 70 associated with combustion air conduit 68 for delivering pressurized airflow to burner 56. By way of non-limiting example, combustion blower 70 may be an electrically powered blower having a capacity of ±500 SCFM (standard cubic feet per minute), and combustion air conduit 68 may be configured to have impose further static pressure of about six inches WC in addition to the static pressure imposed by intake duct 66. As will be understood, combustion blower 70 suctions process air from the airflow created by process fan 62. Outer body 16 encloses diesel engine 64 and process air fan 62. Consequently, heat generated by diesel engine 64 may be pushed by the engine radiator fan into the area around an intake zone of process fan 62 to pre-heat the air that the process fan is taking in, thereby reducing the amount of diesel oil consumed by burner 56 and the drying system overall.

Figure 22:
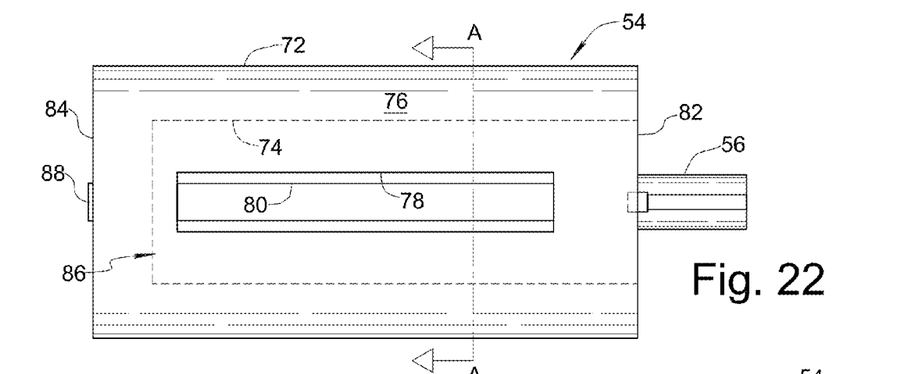
FIG. 22 is a rear view showing a combustion chamber of the combustion system shown in FIG. 21.
Figure 23:
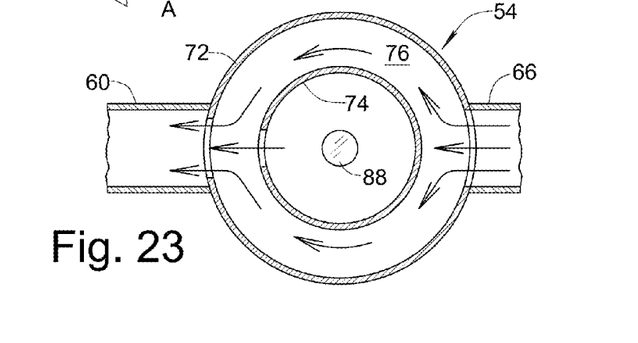
FIG. 23 is a sectional view taken generally along the line A-A in FIG. 22.

Combustion chamber 54, formed in accordance with an embodiment of the present invention, is illustrated in FIGS. 21-23. Combustion chamber 54 includes a generally cylindrical outer shell 72, and a generally cylindrical inner shell 74 arranged radially within outer shell 72 to define an annular space 76 between the inner and outer shells. Inner shell 74 may be coaxial with outer shell 72. In a current embodiment, outer shell 72 has an inner diameter of approximately 38 inches and a length of approximately 63 inches, and inner shell 74 has an inner diameter of approximately 30 inches and a length of approximately 56 inches. Outer shell 72 has an axially elongated outlet opening 78 facing in a rearward direction, and inner shell 74 has an axially elongated exhaust port 80 facing the outlet opening 78 of outer shell 72. Air intake 52 directs a flow of process air into annular space 76 between inner shell 74 and outer shell 72. Burner 56 is mounted at a centered location through a first end wall 82 shared by inner shell 74 and outer shell 72. Outer shell 74 has a second end wall 84 opposite first end wall 82. Inner shell 74 is shorter than outer shell 72 and is open at its second end 86. A viewing window 88 may be located in second end wall 84 to allow the interior of combustion chamber 54 to be viewed looking toward burner 56 at the opposite end.

As may be understood, the design of combustion chamber 54 provides various individually advantageous features. The cross-flow of process air from intake duct 66 into annular space 76 and around inner shell 74 is critical to the chamber life and materials of construction. Additionally, process air flow is allowed to enter inner shell 74 at open second end 86. The compact nature of this air heater requires a very small combustion chamber relative to the size of the burner flame and the amount of heat being released into the process. This exposes the chamber inner walls to extreme heat and high temperatures. Nevertheless, combustion chamber 54 can be fabricated live without using stainless steel or refractory tiles on the inner wall surfaces because of the high velocity and even distribution of the process air flow. Cross-flow of the process air across the curvature of the inner shell instead of the traditional parallel or counterflow (in which the process airflow is laminar, parallel to the wall surfaces without a change in direction) is critical to this principal. The flow of process air in the present embodiment is around the circumference of the annulus, helping improve heat transfer efficiency through increased contact and turbulence. The cylindrical shells 72 and 74 promote even flow of process air and prevent dead spots which can lead to hot spots on the chamber walls. Nested cylindrical shells 72 and 74 also allow for more even expansion of the combustion chamber assembly, preventing the need for expansion joints to accommodate for uneven expansion. The high flow velocity created by the small size of the annular space 76 stimulates high heat transfer from the process air stream to the exterior surface of inner shell 74, which cools the inner surface of inner shell 74 through conduction. High velocity is created by the relatively small size of the annular space 76 relative to the volume of air flow (the smaller the annular space, the higher the air velocity). To achieve high velocity, it is helpful to provide a large pressure drop between the inlet into annular space 76 and the outlet opening 78 from the annulus. This pressure drop has the added positive effect of evenly distributing the air throughout annular space 76 (gasses take the path of least resistance), which causes even distribution of cooling on the outside surface of inner shell 74, thereby preventing hot spots associated with square or rectangular chambers and promoting long life of inner shell 74. Cool process air flowing around the outside of inner shell 74 insulates the inner shell, thereby preventing the need for insulation material on the outside of outer shell 72.

Open second end 86 of inner shell 74 allows process air from annular space 76 to enter the inner shell on the end opposite burner 56 such that process air mixes with the combustion gases inside inner shell 74. This design provides regional pressurization within inner shell 74 by the process air and creates a pressure wave that enters the open-ended inner shell. This pressure wave propagates axially toward burner 56, putting pressure on the burner flame front to effectively shorten the burner flame. The result is a cooler end to combustion chamber 54 and a shorter burner flame. The shorter flame enables use of greater burner BTU capacity in a shorter chamber, which is important for achieving high capacity and performance of the air heater within the confines of a road vehicle of limited width that is suitable for travel down the road and/or fits into a shipping container for overseas shipment.

In order to save space and promote good mixing of the products of combustion and the process air, and thus maximize efficiency of heat transfer from combustion gases in inner shell 74 to the process air, the flow of combustion gasses out of inner shell 74 and the flow of process air out of outer shell 72 share a common outlet area over substantially the entire length of combustion chamber 54. Exhaust port 80 along inner shell 74 and outlet opening 78 along outer shell 72 are axially elongated slots arranged such that the flow of process air pulls the combustion gases out of inner shell 74, causing a turbulent mixing zone, which immediately reduces the combustion exhaust gases from 2500° F. to less than 600° F. Outlet opening 78 has an axial length greater than one-half the total axial length of outer shell 72, and exhaust port 80 has an axial length greater than one-half the total axial length of inner shell 74. The velocity of air discharged from outlet opening 78, determined by the size of the opening in relation to the volume of flow, causes a relative vacuum (relative as both shells are under pressure) between the two flow streams, inducing flow of the gaseous combustion products out of inner shell 74 and into the process air stream. The turbulence created by the expansion of the process air as it exits annular space 76 into the larger mixing manifold 60 comingles the two gas streams, causing instantaneous mixing and thus a homogeneous temperature of the heated air stream. Virtually all of the heat from the combustion gasses is released into the process air stream.

Figure 24:
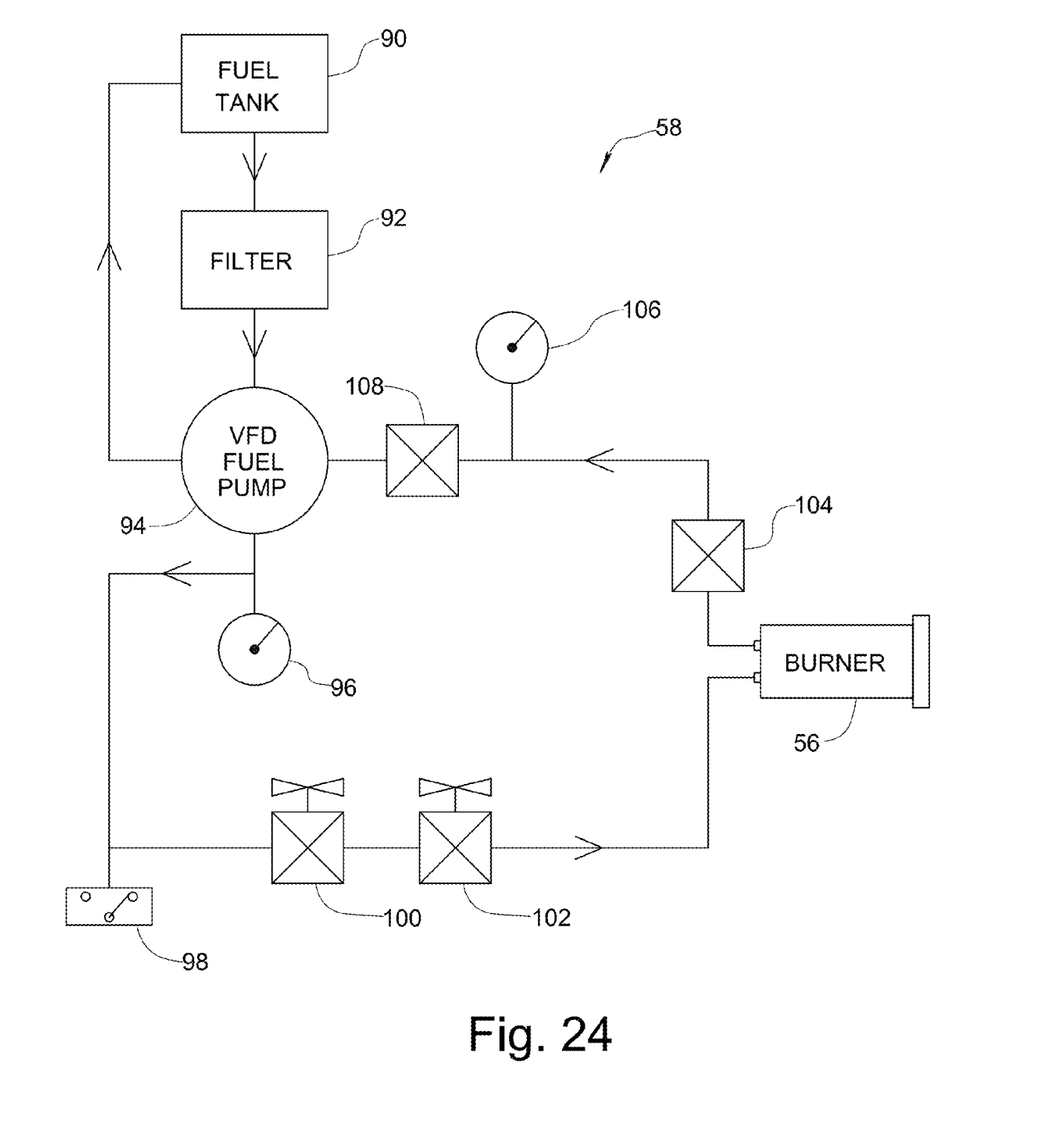
FIG. 24 is a schematic diagram of a fuel supply system for supplying fuel to a combustion burner of the road dryer.

Fuel supply system 58 for supplying fuel to combustion burner 56 is shown in detail in FIG. 24. Combustion burner 56 may be a high-pressure (greater than 200 psi) atomized fuel burner. Fuel supply system includes a fuel tank 90 for containing diesel fuel, a fuel filter 92, and a fuel pump 94. In accordance with the present invention, fuel pump 94 may be driven by a variable frequency drive (VFD) to control fuel pressure to the nozzle of high-pressure atomized burner 56, thereby controlling flow of fuel to the burner and BTU input to the process. Heretofore, VFD pump control has been used with low-pressure, air atomized burners but never with a straight high-pressure atomized nozzle. By "high-pressure atomized nozzle," it is meant that the high fuel pressure out of the small holes in the nozzle cause the atomization of the fuel. In the past, control has been accomplished using modulating valves and solenoid valves to reduce nozzle pressure, but has never been done with a VFD on the fuel supply pump. The fuel pressure exiting VFD fuel pump 94 is monitored by a pressure gauge 96. The fuel line from fuel pump 94 to burner 56 includes a low fuel pressure switch 98 and a pair of safety shut-off valves 100 and 102. A return line having a check valve 104, pressure gauge 106, and needle valve 108 is provided in the fuel return line to the pump. This line re-circulates some of the fuel from the burner nozzle back to the pump suction. The purpose is to keep a constant flow volume and pressure to the burner nozzle. The setting of the needle valve determines the pressure range at the nozzle, which ultimately determines the flow volume range, and thus capacity of the burner.

The temperature of the heated air in nozzle boxes 22 is controlled by modulating the heat input to the burner as follows. A thermocouple (not shown) is located in the center of the nozzle box inlet 28. Air temperature is monitored by a Honeywell process controller allowing user input at an operator control panel 130 (FIG. 13) on outer body 16. The desired temperature at the nozzles is entered into the process controller. The process controller uses a proportional-integral-derivative (PID) control loop to adjust the heat input to the burner to keep the temperature at the desired set point. The heat input is changed by varying the amount of fuel flow to the burner. This is done by sending a 4-20 mA signal to the VFD of fuel pump 94 which controls the speed, and thus delivery rate, of the fuel pump. Thus, a temperature of 300 degrees Fahrenheit (the maximum temperature acceptable in DOT paving operations) may be entered into the controller as a temperature set point, and the closed loop control system ensures the air delivery temperatures do not exceed the set point.

Mixing manifold 60 receives the combustion gases from inner shell 74 and process air from annular space 76 through an elongated inlet opening 110 facing outlet opening 78. Baffling 112 may be arranged within mixing manifold 60 to promote mixing. It is desirable to control the combustion system such that heated air in mixing manifold 60 is in a temperature range of about 300-450° F. Mixing manifold 60 includes a plurality of exit ports 114 each corresponding to a respective one of the plurality of nozzle boxes 22.

Figure 10:
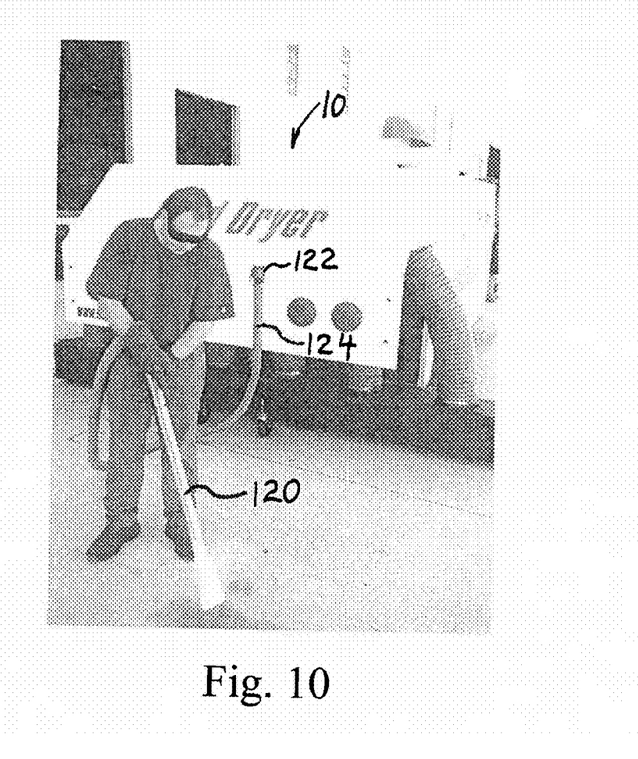
FIG. 10 is a perspective view showing a worker using an auxiliary wand attachment of the road dryer.
Figure 11:
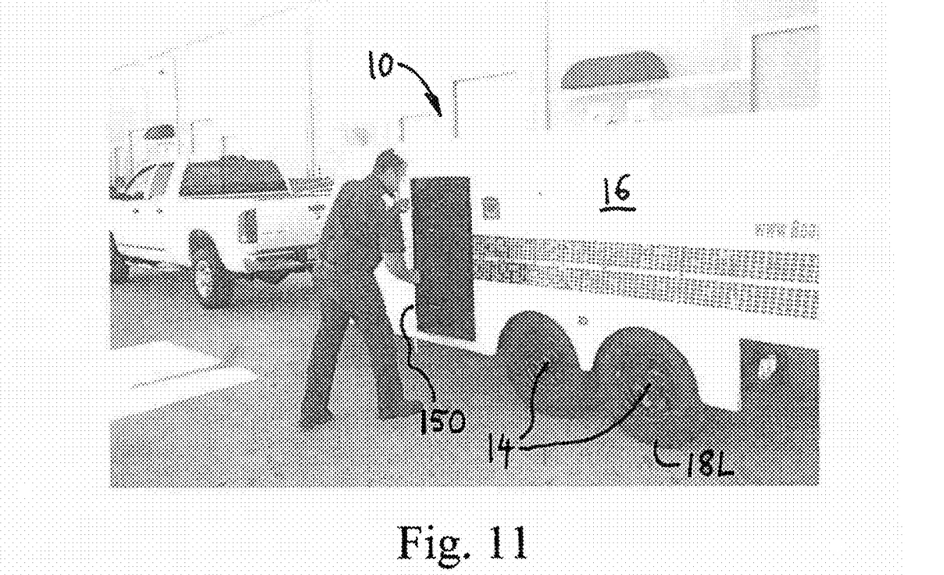
FIG. 11 is a perspective view showing the road dryer with an opened front maintenance door.
Figure 12:
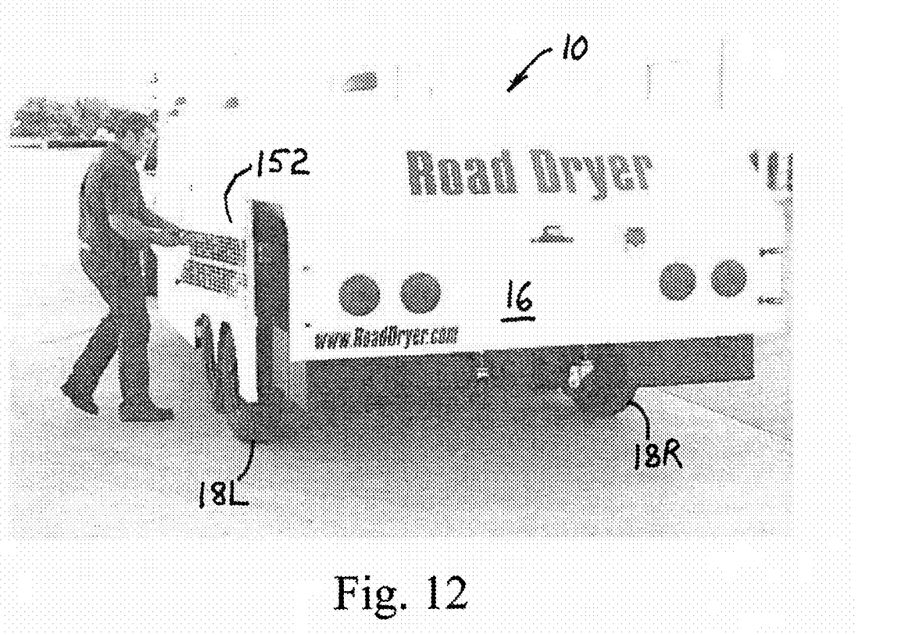
FIG. 12 is a perspective view showing the road dryer with an opened rear maintenance door.

As mentioned above, a plurality of flexible ducts 116 are arranged to extend between the exit ports 114 of mixing manifold 60 and the inlet openings 28 of corresponding nozzle boxes 22. In the embodiment described herein, there are six nozzle boxes 22 and six flexible ducts 116. Flexible ducts 116 may be high-temperature flexible hoses. Flexibility of ducts 116 allows vertical adjustment of nozzle assembly 20 and transverse (lateral) adjustment of leftmost nozzle box 22L and rightmost nozzle box 22R. An auxiliary conduit 118 may be provided for receiving flow of heated process air from mixing manifold 60, and a fluid-conducting hand-held wand 120 may be removably connected to the auxiliary conduit 118 for spot drying localized regions of the surface. As shown in FIG. 10, the auxiliary conduit 118 may be arranged such that it has an outlet coupling 122 at the rear of outer body 16, and wand 120 may be connected to outlet coupling 122 by a flexible hose 124.

Figure 17:
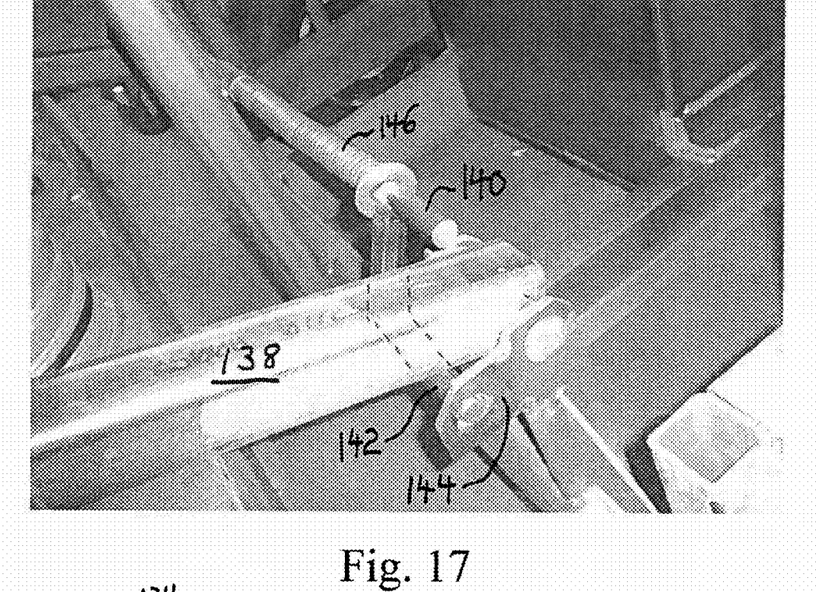
FIG. 17 is another close-up view showing the lock bar engaging one of the hinge arms.
Figure 18:
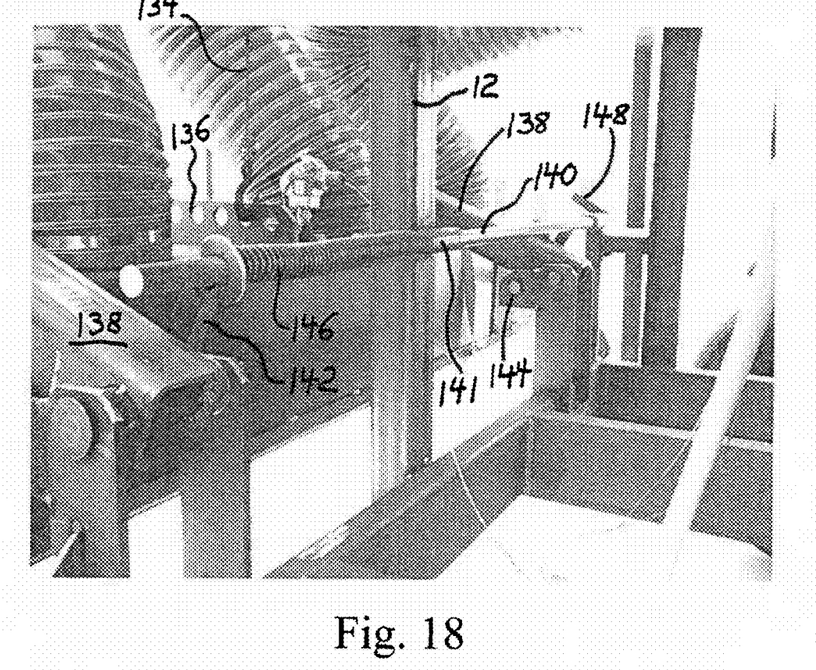
FIG. 18 is a further view of the lock bar and hinge arms from an opposite side of the road dryer.

A vertical lift mechanism 130 for raising nozzle assembly 20 to a stowed position and lowering the nozzle assembly to an operating position will now be described with reference to FIGS. 14-18. In the present embodiment, vertical lift mechanism 130 comprises an electrically powered hoist 132 having a drum-wound cable 134 attached at its distal free end to an attachment bracket 136 fixed to nozzle assembly 20. A pair of hinge arms 138 have opposite ends pivotally mounted to chassis 12 and nozzle assembly 20, respectively. A transversely extending lock bar 140 may be provided to maintain nozzle assembly 20 in its upward stowed position so that hoist 132 and cable 134 are not loaded when nozzle assembly 20 is in the stowed position. Lock bar 140 may be received within aligned sleeves 141 fixed to chassis 12 such that lock bar 140 can slide transversely relative to chassis 12. Lock bar 140 has a pair of L-shaped appendages 142 sized to under-engage a corresponding hinge arm 138 such that a distal end of the appendage is received in a corresponding support journal 144 fixed to chassis 12, as best seen in FIG. 17. Lock bar 140 is biased by a spring 146 toward its locking position shown in FIG. 17, but may be moved manually in a transverse direction against the bias of spring 146 to release nozzle assembly 20 for hoist-controlled vertical movement. To lower nozzle box 20 to its operating position from its stowed position, an "up" button for hoist 132 is activated briefly to take the load off lock bar 140, then lock bar 140 is pulled manually using handle 148 in a transverse direction against the bias of spring 146 to unlock hinge arms 138, and then a "down" button for hoist 132 is activated to lower nozzle assembly 20 onto its wheel attachments 24. To raise nozzle box 20 to its stowed position from its operating position, the hoist "up" button is activated until nozzle assembly 20 and hinge arms 138 have moved sufficiently to allow lock bar 140 with appendages 142 to snap back into the locking position shown in FIG. 17 at the urging of spring 146, and then the hoist "down" button is briefly activated to take the load of hoist 132 and cable 134.

As will be understood, alternative vertical lift mechanisms and arrangements are of course possible, including arrangements involving multiple pulleys connected to a single hoist, multiple hoists with or without pulleys, and mechanisms comprising electromechanical, pneumatic, and/or hydraulic actuators. Other locking mechanisms and arrangements are also possible. It will also be understood that vertical lift mechanism 130 may be operated to move nozzle assembly 20 to various intermediate vertical positions between the stowed and operating positions described above, whereby the vertical spacing of nozzle assembly 20 from the road surface may be adjusted for a particular drying operation dependent upon surface conditions and other factors.

Figure 13:
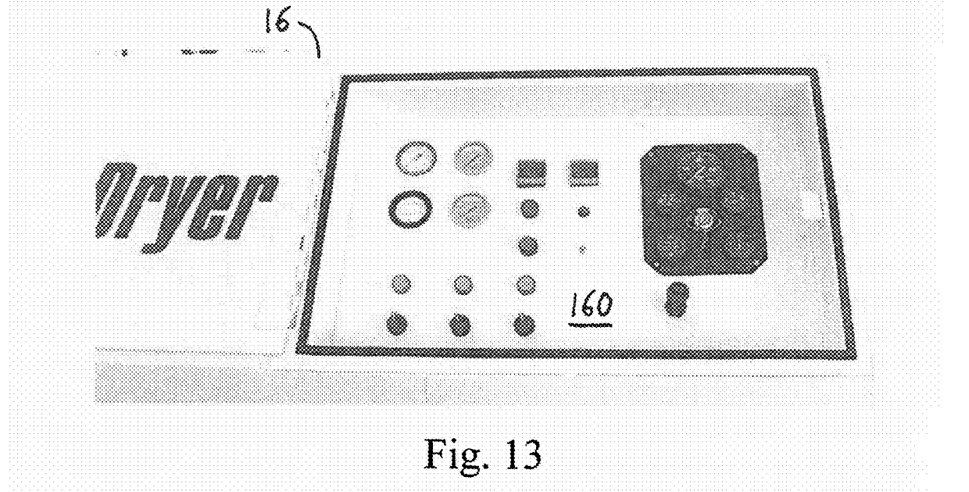
FIG. 13 is a view showing a control panel of the road dryer in detail.

Outer body 16 may include a plurality of access doors 150 for allowing access to internal components of road dryer 10 and to viewing window 88 of combustion chamber 54. Outer body 16 may further include left and right rear access doors 152 that may be opened to allow space for flexible ducts 116 connected to leftmost nozzle box 22L and rightmost nozzle box 22R when such nozzle boxes are extended. Control buttons, switches and gauges associated with combustion system 50 and lifting mechanism 130 may be located on a control panel 160 on outer body 16 as depicted in FIG. 13, and/or on an internal panel accessible through one of the access doors 150 or 152. Outer body 16 encloses diesel engine 64 and process air fan 62. The heat generated by diesel engine 64 may be pushed by the engine radiator fan, into the area around an intake zone of process fan 62 to pre-heats the air that the process fan is taking in, thereby reducing the amount of diesel oil consumed by burner 56 and the drying system overall.

Road dryer 10 is designed to expedite drying during times of high moisture as in morning dew or short rain showers. With this machine, road crews can immediately begin drying the road surface to levels that exceed DOT requirements and they can accomplish this at a rate that is equal to or is faster than their paving machines can operate. Road dryer 10 allows crews to continue paving as soon as a rain shower ends, thereby eliminating delay.

This new machine is unique in its combustion chamber design and process air flow such that the heated air delivered to the road surface is below 20% moisture content and very low in hydrocarbon emissions. Road dryer 10 has a closed loop control system operable to ensure the air delivery temperature does not exceed a user-selected set point, for example 300 degrees Fahrenheit, which is a temperature acceptable in DOT paving operations. This new machine also incorporates a unique nozzle box design that projects the conditioned drying air in a manner that creates turbulence under the nozzle box. This turbulence helps to suspend the road surface water particles, and combined with the conditioned drying air, it significantly increases the efficiency of the machine.

The present invention is further embodiment by a method of drying a surface. The method generally comprises the following steps: (A) providing a vehicle comprising a combustion system operable to generate heated air and a nozzle assembly in flow communication with the combustion system for directing the heated air onto the surface to be dried, wherein the nozzle assembly is adjustable to different transverse widths, wherein the nozzle assembly is mounted on the vehicle for vertical movement relative between an upward stowed position and a downward operating position; (B) driving the vehicle to a job site while the nozzle assembly is in its upward stowed position; (C) lowering the nozzle assembly to its downward operating position; (D) adjusting the transverse width of the nozzle assembly; (E) operating the combustion system to generate heated air; and (F) driving the vehicle while the nozzle assembly is in its operating position and the combusting system is generating heated air, whereby the heated air is directed onto the surface by the nozzle assembly. The vehicle may include a towing vehicle and a trailer chassis detachably coupled to the towing vehicle, wherein the combustion system and nozzle assembly are mounted on the trailer chassis. The vehicle provided in step (A) may further comprise a fluid-conducting hand-held wand removably connectable to the combustion system for spot drying localized regions of the surface.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. An apparatus for drying a surface, the apparatus comprising:
    a chassis including at least one transversely extending axle having a leftmost wheel and a rightmost wheel mounted on the axle for rotation about a common axis;
    a combustion system carried by the chassis and operable to generate heated air, the combustion system comprising:
        i) a process air intake for providing a flow of process air;
        ii) a combustion chamber including a generally cylindrical outer shell having an axially elongated outlet opening, a generally cylindrical inner shell arranged within the outer shell to define an annular space between the inner and outer shells and having an axially elongated exhaust port facing the outlet opening of the outer shell, wherein the process air intake directs a flow of process air into the annular space between the inner and outer shells;
        iii) a burner arranged at one end of the inner shell;
        iv) a fuel supply system connected to the burner, and
        v) a mixing manifold having an inlet opening facing the outlet opening of the outer shell through which the mixing manifold receives hot exhaust gas from an interior space of the inner shell and air from the annular space between the inner and outer shells, wherein the hot exhaust gas mixes with the process air;
    at least one duct in flow communication with the mixing manifold; and
    a nozzle assembly mounted on the chassis and arranged in flow communication with the mixing manifold via the at least one duct for directing the heated process air onto the surface to be dried.

2. The apparatus according to claim 1, wherein the exhaust port of the inner shell has an axial length greater than one-half the axial length of the inner shell, and the outlet opening of the outer shell has an axial length substantially corresponding to the axial length of the exhaust port of the inner shell.

3. The apparatus according to claim 1, wherein the nozzle assembly is mounted for vertical movement relative to the chassis between an upward stowed position and a downward operating position.

4. The apparatus according to claim 3, wherein the nozzle assembly comprises a plurality of nozzle boxes, and the at least one duct comprises a plurality of flexible ducts each communicating to a respective one of the plurality of nozzle boxes.

5. The apparatus according to claim 4, wherein each of the plurality of nozzle boxes includes:
    a top wall having an inlet opening through which the respective flexible duct communicates;
    a plurality of vertical side walls depending downwardly from the top wall, the plurality of vertical side walls including a left side wall, a right side wall, a front side wall, and a rear side wall; and
    a pair of internal inclined walls extending between the left and right side walls, the internal inclined walls forming an inverted V-shaped profile, wherein a front discharge slot, a rear discharge slot, and a substantially enclosed space between the front and rear discharge slots are defined.

6. The apparatus according to claim 1, further comprising an auxiliary conduit for receiving flow of heated process air from the mixing manifold and a fluid-conducting hand-held wand removably connectable to the auxiliary conduit for spot drying localized regions of the surface.

7. The apparatus according to claim 1, wherein the chassis includes a trailer coupler.

8. The apparatus according to claim 1, wherein the burner includes a high-pressure atomized nozzle and the fuel supply system includes a fuel pump having a variable frequency drive for controlling fuel pressure to the high-pressure atomized nozzle.

9. The apparatus according to claim 1, wherein the inner shell and outer shell of the combustion chamber share a common end wall in which the burner is mounted, and the inner shell has an open end opposite the common end wall.

10. The apparatus according to claim 1, wherein the fuel supply system supplies diesel fuel to the burner.

11. An apparatus for drying a surface, the apparatus comprising:
    a chassis including at least one transversely extending axle having a leftmost wheel and a rightmost wheel mounted on the axle for rotation about a common axis;
    a combustion system carried by the chassis, the combustion system being operable to generate heated air; and
    a nozzle assembly mounted on the chassis and in flow communication with the combustion system for directing the heated air onto the surface to be dried, wherein the nozzle assembly is adjustable to different transverse widths;
    wherein the nozzle assembly includes a plurality of nozzle boxes each in flow communication with the combustion system, the plurality of nozzle boxes having a leftmost nozzle box, a rightmost nozzle box, and at least one middle nozzle box between the leftmost and rightmost nozzle boxes;
    wherein the leftmost nozzle box is individually adjustable between an extended configuration wherein the leftmost nozzle box extends in a transverse direction beyond the leftmost wheel and a retracted configuration wherein the leftmost nozzle box does not extend in a transverse direction beyond the leftmost wheel, and the rightmost nozzle box is individually adjustable between an extended configuration wherein the rightmost nozzle box extends in a transverse direction beyond the rightmost wheel and a retracted configuration wherein the rightmost nozzle box does not extend in a transverse direction beyond the rightmost wheel;

wherein the leftmost nozzle box is hingedly connected to an adjacent middle nozzle box such that the leftmost nozzle box is transversely aligned with its adjacent middle nozzle box when the leftmost nozzle box is in its extended configuration and the leftmost nozzle box is transversely overlapped with its adjacent middle nozzle box when the leftmost nozzle box is in its retracted configuration, and the rightmost nozzle box is hingedly connected to an adjacent middle nozzle box such that the rightmost nozzle box is transversely aligned with its adjacent middle nozzle box when the rightmost nozzle box is in its extended configuration and the rightmost nozzle box is transversely overlapped with its adjacent middle nozzle box when the rightmost nozzle box is in its retracted configuration.

12. The apparatus according to claim 11, wherein the at least one middle nozzle box consists of exactly four nozzle boxes.

13. An apparatus for drying a surface, the apparatus comprising:
- a chassis including at least one transversely extending axle having a leftmost wheel and a rightmost wheel mounted on the axle for rotation about a common axis;
- a combustion system carried by the chassis, the combustion system being operable to generate heated air; and
- a nozzle assembly mounted on the chassis and in flow communication with the combustion system for directing the heated air onto the surface to be dried, wherein the nozzle assembly is adjustable to different transverse widths;

wherein the nozzle assembly includes a plurality of nozzle boxes each in flow communication with the combustion system, the plurality of nozzle boxes having a leftmost nozzle box, a rightmost nozzle box, and at least one middle nozzle box between the leftmost and rightmost nozzle boxes;

wherein the nozzle assembly is mounted on the chassis for vertical movement relative to the chassis between an upward stowed position and a downward operating position;

wherein the nozzle assembly is mounted on the chassis by a plurality of hinge arms each having a first end pivotally coupled to the chassis and a second end pivotally coupled to the nozzle assembly, and the apparatus further comprises:
- a cable hoist carried by the chassis and having a cable attached at its free end to the nozzle assembly, wherein the cable hoist is operable to raise and lower the nozzle box between its upward stowed position and its downward operating position; and
- a transversely extending releasable lock bar biased to engage the plurality of hinge arms to support the nozzle assembly in its upward stowed position.

14. The apparatus according to claim 13, wherein the at least one middle nozzle box includes a wheel attached to a front side wall or to a rear side wall of the middle nozzle box for engaging the surface to be dried when the nozzle assembly is in the downward operating position.

* * * * *